(12) United States Patent
Gokavarapu et al.

(10) Patent No.: US 11,163,601 B2
(45) Date of Patent: *Nov. 2, 2021

(54) DYNAMICALLY DETERMINE THE TRANSACTION COORDINATOR IN MULTITIER HYBRID TRANSACTION PROCESSING MIDDLEWARE SYSTEMS

(71) Applicant: International Business Machines Corporation, Armonk, NY (US)

(72) Inventors: Nageswararao V. Gokavarapu, Bangalore (IN); Jithesh Moothoor, Bangalore (IN); Raghavendran Srinivasan, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 197 days.

This patent is subject to a terminal disclaimer.

(21) Appl. No.: 16/553,413

(22) Filed: Aug. 28, 2019

(65) Prior Publication Data
US 2019/0384629 A1 Dec. 19, 2019

Related U.S. Application Data

(63) Continuation of application No. 15/674,877, filed on Aug. 11, 2017, now Pat. No. 10,579,415.

(51) Int. Cl.
*G06F 16/00* (2019.01)
*G06F 9/46* (2006.01)
*G06Q 10/10* (2012.01)

(52) U.S. Cl.
CPC ............ *G06F 9/466* (2013.01); *G06Q 10/10* (2013.01)

(58) Field of Classification Search
CPC ............ G06F 9/46; G06F 16/00; G06F 9/466; G06Q 10/10
See application file for complete search history.

(56) References Cited

U.S. PATENT DOCUMENTS 6,799,188 B2   9/2004   Weedon
8,276,141 B2   9/2012   Kaczynski et al.
(Continued)

OTHER PUBLICATIONS

Jim Gray and Leslie Lamport, "Consensus on Transaction Commit", Microsoft Research, ACM Transactions on Database Systems, vol. 31, No. 1, Mar. 2006, pp. 133-160. (Year: 2006).*

(Continued)

*Primary Examiner* — Cheryl Lewis
(74) *Attorney, Agent, or Firm* — Cantor Colburn LLP; Teddi Maranzano

(57) ABSTRACT

A technique relates to dynamically determining a transaction coordinator. A transaction processing middleware (TPM) coordinator receives TPM weightages of TPM participants, where the TPM coordinator has a TPM coordinator weightage, and where the TPM coordinator and TPM participants are executing a transaction instance. The TPM coordinator individually compares the TPM coordinator weightage to each of the TPM weightages of the TPM participants. In response to not one of the TPM weightages of the TPM participants being greater than the TPM coordinator weightage, the TPM coordinator is kept unchanged. In response to a given TPM weightage of the TPM weightages of the TPM participants being greater than the TPM coordinator weightage, the TPM coordinator changes a TPM coordinator function to a given TPM participant having the given TPM weightage such that the given TPM participant is an interim TPM coordinator for the transaction instance.

20 Claims, 11 Drawing Sheets

(56) References Cited

U.S. PATENT DOCUMENTS

| | | |
|---|---|---|
| 9,165,025 B2 | 10/2015 | Maple et al. |
| 2003/0046342 A1 | 3/2003 | Felt et al. |
| 2012/0166889 A1* | 6/2012 | El-Kersh .............. G06F 9/466 |
| | | 714/48 |
| 2013/0024863 A1 | 1/2013 | Parkinson et al. |
| 2013/0318160 A1 | 11/2013 | Beraka et al. |
| 2014/0067904 A1 | 3/2014 | Kaczynski et al. |
| 2015/0193264 A1 | 7/2015 | Hutton et al. |
| 2019/0050251 A1 | 2/2019 | Gokavarapu et al. |

OTHER PUBLICATIONS

List of IBM Patents or Patent Applications Treated as Related; Appendix P; Date Filed: Aug. 28, 2019, 2 pages.

* cited by examiner

FIG. 11

RECEIVE, BY A TRANSACTION PROCESSING MIDDLEWARE (TPM) COORDINATOR, TPM WEIGHTAGES OF TPM PARTICIPANTS, WHEREIN THE TPM COORDINATOR HAS A TPM COORDINATOR WEIGHTAGE, WHEREIN THE TPM COORDINATOR AND TPM PARTICIPANTS ARE EXECUTING A TRANSACTION INSTANCE 1102

INDIVIDUALLY COMPARE, BY THE TPM COORDINATOR, THE TPM COORDINATOR WEIGHTAGE TO EACH OF THE TPM WEIGHTAGES OF THE TPM PARTICIPANTS 1104

IN RESPONSE TO NOT ONE OF THE TPM WEIGHTAGES OF THE TPM PARTICIPANTS BEING GREATER THAN THE TPM COORDINATOR WEIGHTAGE, KEEP THE TPM COORDINATOR THE SAME 1106

IN RESPONSE TO A GIVEN TPM WEIGHTAGE OF THE TPM WEIGHTAGES OF THE TPM PARTICIPANTS BEING GREATER THAN THE TPM COORDINATOR WEIGHTAGE, CHANGE, BY THE TPM COORDINATOR, TPM COORDINATOR FUNCTION TO A GIVEN TPM PARTICIPANT HAVING THE GIVEN TPM WEIGHTAGE SUCH THAT THE GIVEN TPM PARTICIPANT IS AN INTERIM TPM COORDINATOR FOR THE TRANSACTION INSTANCE 1108

DYNAMICALLY DETERMINE THE TRANSACTION COORDINATOR IN MULTITIER HYBRID TRANSACTION PROCESSING MIDDLEWARE SYSTEMS

DOMESTIC PRIORITY

This application is a continuation of U.S. patent application Ser. No. 15/674,877, filed Aug. 11, 2017, the disclosure of which is incorporated by reference herein in its entirety.

BACKGROUND

The present invention generally relates to computer systems, and more specifically, to dynamically determining the transaction coordinator in multitier hybrid transaction processing middleware systems.

In the early days of computing, there was no need for distributed transactions. As the number of applications increased, synchronization of the data become an important issue. Companies need to maintain synchronized systems in terms of data flow. As a result, the two phase commit protocol referred to as XA (eXtended Architecture) arose. The two phase commit protocol provides properties for global transaction processing which include XA transactions. The two phase commit protocol is an atomic commitment protocol for distributed systems. This protocol as its name implies consists of two phases. The first one is commit-request phase in which the transaction manager/coordinator coordinates all of the transaction resources to commit or abort. In the commit-phase, the transaction manager decides to finalize operation by committing or aborting according to the votes of each transaction resource.

SUMMARY

Embodiments of the present invention are directed to a computer-implemented method for dynamically determining a transaction coordinator. A non-limiting example of the computer-implemented method includes receiving, by a transaction processing middleware (TPM) coordinator, TPM weightages of TPM participants, where the TPM coordinator has a TPM coordinator weightage, where the TPM coordinator and TPM participants are executing a transaction instance. The method includes individually comparing, by the TPM coordinator, the TPM coordinator weightage to each of the TPM weightages of the TPM participants, and in response to not one of the TPM weightages of the TPM participants being greater than the TPM coordinator weightage, keeping the TPM coordinator unchanged. The method includes in response to a given TPM weightage of the TPM weightages of the TPM participants being greater than the TPM coordinator weightage, changing, by the TPM coordinator, a TPM coordinator function to a given TPM participant having the given TPM weightage such that the given TPM participant is an interim TPM coordinator for the transaction instance.

Embodiments of the present invention are directed to a system for dynamically determining a transaction coordinator. A non-limiting example of the system includes a processing circuit, and a storage medium readable by the processing circuit and storing instructions that, when executed by the processing circuit, cause the processing circuit to perform a method. The method includes receiving, by a transaction processing middleware (TPM) coordinator, TPM weightages of TPM participants, where the TPM coordinator has a TPM coordinator weightage, where the TPM coordinator and TPM participants are executing a transaction instance. The method includes individually comparing, by the TPM coordinator, the TPM coordinator weightage to each of the TPM weightages of the TPM participants, and in response to not one of the TPM weightages of the TPM participants being greater than the TPM coordinator weightage, keeping the TPM coordinator unchanged. The method includes in response to a given TPM weightage of the TPM weightages of the TPM participants being greater than the TPM coordinator weightage, changing, by the TPM coordinator, a TPM coordinator function to a given TPM participant having the given TPM weightage such that the given TPM participant is an interim TPM coordinator for the transaction instance.

Embodiments of the invention are directed to a computer program product for dynamically determining a transaction coordinator, the computer program product including a computer readable storage medium having program instructions embodied therewith. The program instructions are executable by a processor to cause the processor to perform a method. A non-limiting example of the method includes receiving, by a transaction processing middleware (TPM) coordinator, TPM weightages of TPM participants, where the TPM coordinator has a TPM coordinator weightage, where the TPM coordinator and TPM participants are executing a transaction instance. The method includes individually comparing, by the TPM coordinator, the TPM coordinator weightage to each of the TPM weightages of the TPM participants, and in response to not one of the TPM weightages of the TPM participants being greater than the TPM coordinator weightage, keeping the TPM coordinator unchanged. The method includes in response to a given TPM weightage of the TPM weightages of the TPM participants being greater than the TPM coordinator weightage, changing, by the TPM coordinator, a TPM coordinator function to a given TPM participant having the given TPM weightage such that the given TPM participant is an interim TPM coordinator for the transaction instance.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 11 is a flow chart of a computer-implemented method for dynamically determining a transaction coordinator according to embodiments of the present invention.

Figure 1:
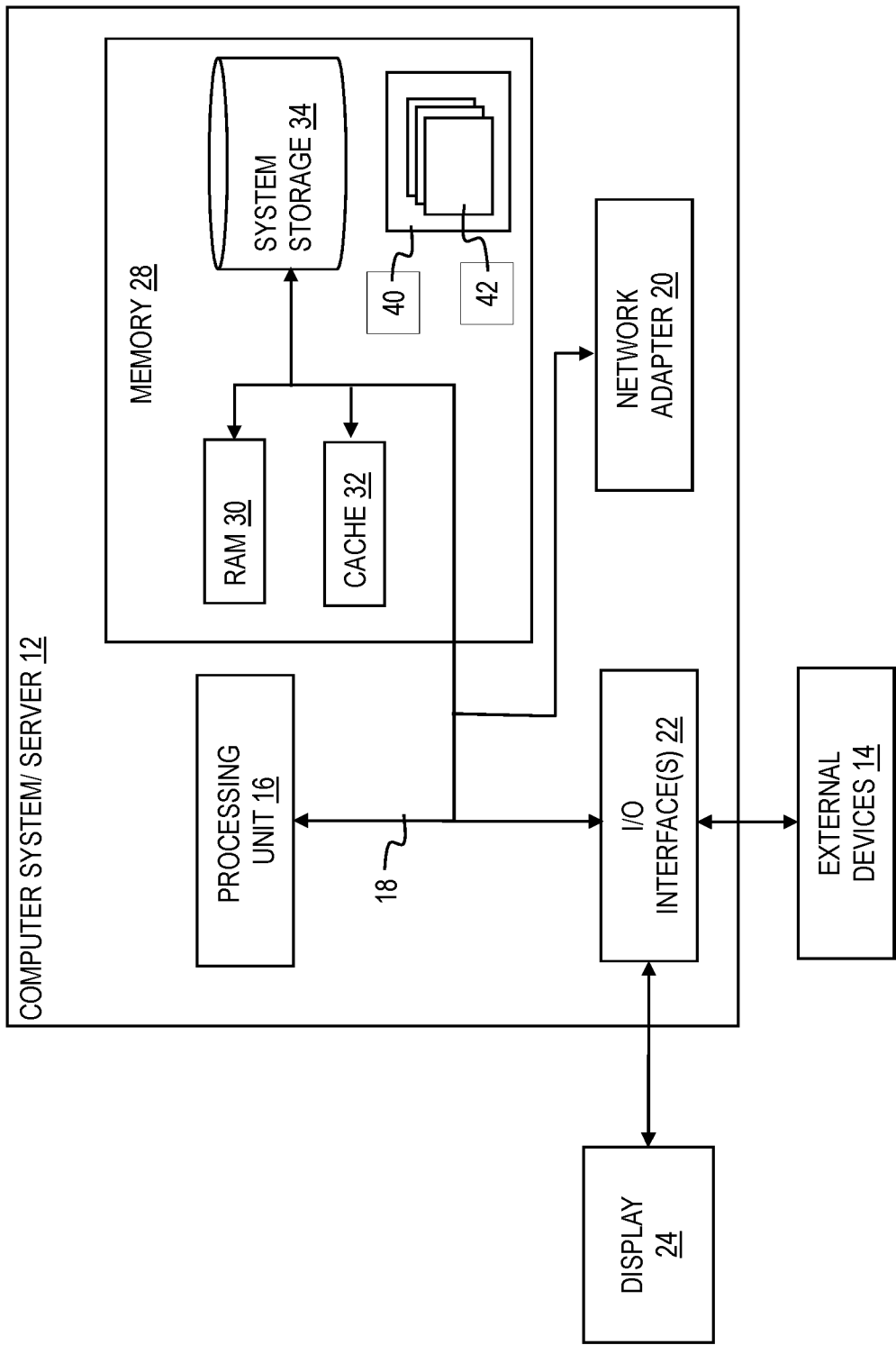
FIG. 1 depicts a schematic of an example computing node according to embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number corresponds to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In normal execution of any single distributed transaction, the protocol consists of two phases: 1) the commit-request phase (or voting phase) is when a coordinator process attempts to prepare all the transaction's participating processes (named participants, cohorts, or workers) to take the necessary steps for either committing or aborting the transaction and to vote, either "Yes" commit (if the transaction participant's local portion execution has ended properly), or "No" abort (if a problem has been detected with the local portion). 2) The commit phase is when, based on voting of the cohorts, the coordinator decides whether to commit (only if all have voted "Yes") or abort the transaction (otherwise), and notifies the result to all the cohorts. The cohorts then follow with the needed actions (commit or abort) with their local transactional resources (also called recoverable resources, e.g., database data) and their respective portions in the transaction's other output (if applicable).

Turning now to an overview of technologies that are more specifically relevant to aspects of the invention, distributed transaction processing middleware products (TPMs) are implemented using different software architectures to suit the services they provide as well as the platforms on which they run. Large enterprise architecture usually includes both traditional non-Java transactional processing systems (e.g., predefined software) and Java™ based transaction processing system (JEE) (a different predefined software). The Java based TPM manages, for example, only one process for a transaction. However, the logical unit of work (LUW) that is required to run the transaction uses its own thread within the master process, which can be both a Java based TPM and non-Java based TPMs like IBM® TXSeries servers which use the operating system process to run the logical unit of work (LUW) for every transaction.

A Java based TPM can be connected with a traditional (non-Java based) TPM using XA based protocol standards as understood by one skilled in the art. For example, an XA connection can be established between IBM® WebSphere®

Application Server (which can be Java based) and IBM® CICS® Transaction Server for z/OS® (which can be non-Java based). Although Java based TPMs can be connected with a traditional TPM, it is a challenge to manage the transaction resolution and transaction resolution call optimization across multitier heterogeneous transaction processing middleware systems because a traditional non-Java based TPM which is already interconnected with (other) multiple traditional (non-Java) TPMs uses native proprietary protocols and vice versa. Multitier heterogeneous/hybrid transaction processing middleware systems refer to having, for example, Java based and non-Java based TPMs connected together to perform a transaction, in which some TPMs are connected to proceed other TPMs.

Turning now to an overview of the aspects of the invention, one or more embodiments of the invention address the above-described shortcomings of the prior art by providing a mechanism for choosing the transaction coordinator dynamically for each transaction instance to achieve better transaction resolution call optimization in multitier heterogeneous/hybrid transaction processing middleware systems. The above-described aspects of the invention address the shortcomings of the prior art by providing technical effects and benefits in which dynamically choosing the transaction coordinator for the TPMs achieves better transaction resolution flow optimization. Also, if a TPM coordinator invoking the transaction is not capable of handling the 2 phase commit to all the participants involved in the transaction, the current transaction coordinator can dynamically change the coordinator privilege to one of the transaction participants who is capable of handling the 2 phase with all its participants.

Turning now to a more detailed description of aspects of the present invention, FIG. 1 depicts a schematic of an example computing node according to embodiments of the present invention. The computing node includes a computer system/server 12, which is operational with numerous other general purpose or special purpose computing system environments or configurations. Each TPM can be included in a server, mainframe, etc., and the computer system/server 12 can be representative of various types of computer systems on which the TPMs can run.

Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The components of computer system/server 12 may include, but are not limited to, one or more processors or processing units 16, a system memory 28, and a bus 18 that couples various system components including system memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media. The system memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. Memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include but are not limited to: microcode, device drivers, redundant processing units, external disk drive arrays, RAID systems, tape drives, and data archival storage systems, etc.

Figure 2:
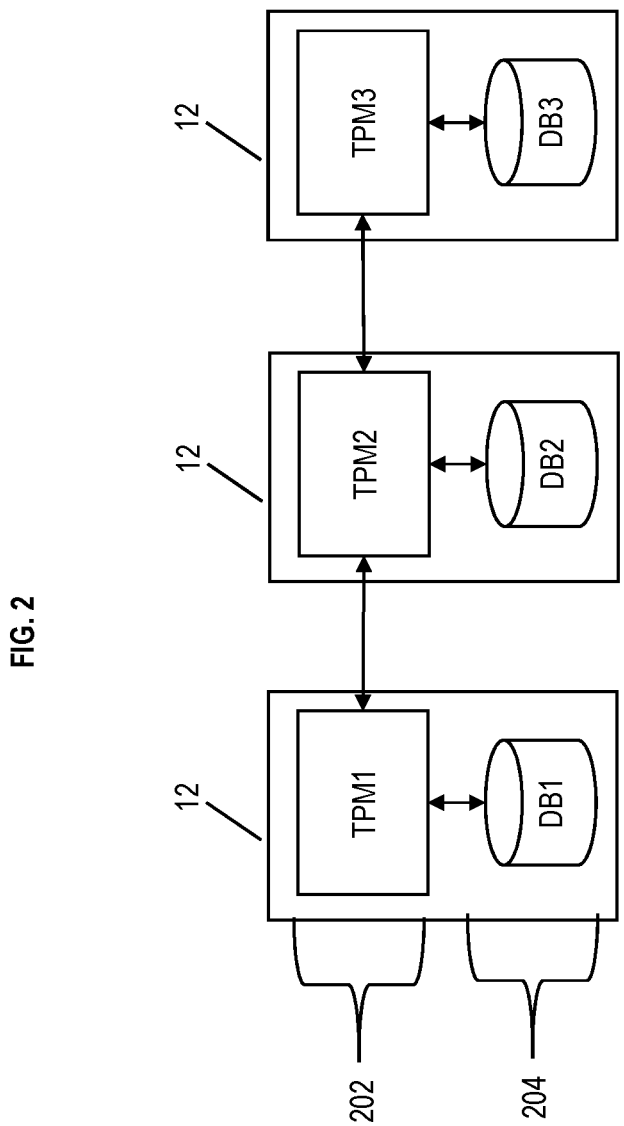
FIG. 2 depicts multitier heterogeneous transaction processing middleware (TPM) systems according to embodiments of the present invention.

FIG. 2 depicts multitier heterogeneous TPM systems according to embodiments of the present invention. Each of the TPMs can be hosted in its own computer system/server 12 discussed above and be connected to its own database (which can be more than one database). The TPM can also be referred to as transaction processing monitor middleware. The computer systems/servers 12 can be operatively connected together via a computer network. The TPMs can be represented as TPMs 202 which are depicted as TPM1, TPM2, and TPM3 in this example. The databases can be represented as databases 204 which are depicted as database 1 (DB1), database 2 (DB2), and database 3 (DB3). In this example, TPM1 is connected to DB1, TPM2 is connected to DB2, and TPM3 is connected to DB3. The databases 204 represent memory that is accessible by the TPMs 202, and the databases 204 are sometimes called and/or include resource managers.

For explanation purposes, TPM1 is directly/immediately upstream from (or precedes) TPM2 with respect to a transaction initiated by TPM1. TPM2 is directly/immediately upstream from (or precedes) TPM3. Conversely, TPM3 is directly/immediately downstream from (or subsequent to) TPM2. TPM2 is directly/immediately downstream from (or subsequent to) TPM1.

It is assumed that there is a distributed transaction to be processed, which is also referred to as a global transaction. Operations involving multiple databases require transactional access. The operation is either successful or fails, but always has to leave all involved databases in a consistent state. The transaction may or may not interact with all the resource managers connected to TPMs based on application logic. A resource manager can be a represented as a database, such as DB1, DB2, DB3, etc.

The TPM which initiates a logical unit of work (LUW) acts as a TPM coordinator. The TPM coordinator can also be referred to as the transaction manager. The TPM coordinator serves as coordination point in the distributed transaction. Other TPMs involved in the transaction/LUW acts as a TPM participant. According to embodiments of the present invention, TPMs have the capability to optimize transaction resolution flow if it connects to similar TPMs. In a multitier hybrid transaction processing middleware systems in which the TPM coordinator only coordinates the transaction, although one of the TPM participants has a capability to coordinate with other TPMs and can achieve better transaction resolution optimization if the TPM coordinator becomes a participant to the distributed transaction instead of the TPM coordinator, in accordance with embodiments of the present invention. However, this cannot be performed in the state-of-the-art as there is no known method to dynamically decide the transaction coordinator for a transaction instance. Suppose that the TPM1 is the transaction coordinator but one the participant TPMs could achieve better transaction resolution optimization. The TPMs are configured with software (including firmware, microcode, etc.) for choosing the transaction coordinator dynamically for each transaction instance to achieve better transaction resolution call optimization in multitier hybrid transaction processing middleware systems. The global transaction execution consists of two types of flows across TPMs involved in the transaction. The first flow is an application flow, during which actual business logic executes in the TPM, and second flow is the transaction resolution flow, during which TPM coordinator decides to COMMIT or ROLLBACK the work after confirming the readiness of each participating TPM. In a TPM environment, the business logic is a part of the transaction program that encodes business rules that determine how data gets created, stored, and updated. The embodiments of the present invention provide a method to determine, for example, a weightage for TPMs (during application flow) and propagate the weightage along the application execution response during application flow. Based on weightage, the best TPM coordinator for the transaction can be detected dynamically (for example, during runtime and/or during the execution of the transaction) to achieve the best transaction resolution flow optimization according to embodiments of the present invention. Transaction resolution is defined as an activity performed by a transaction manager to commit or rollback a transaction across all its participants through X/Open XA standards.

In a typical architecture for complex enterprises, multiple TPMs are interconnected with proprietary protocols. As technology changes day by day, there is a need for modernization or integration with other services. For example, the transactions running in the traditional non-Java TPM need to integrate seamlessly with Java based TPMs to extend the business logic due to integrations or to consume new services. Accordingly, there is a need for modernization of applications running in one TPM by integrating with other services running on other TPMs. As a result of this, the number of TPMs involved in a logical unit of work or transactions are increasing.

Figure 3:
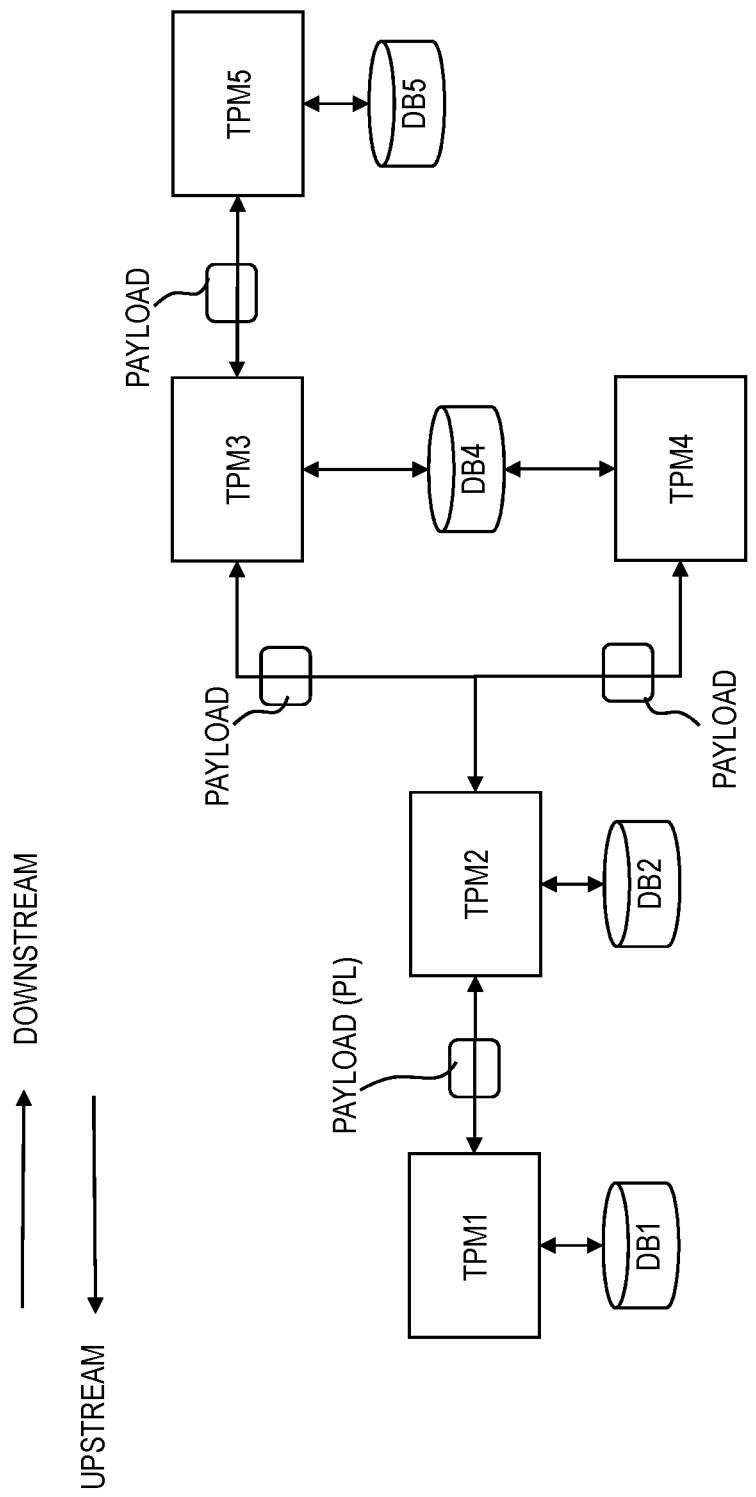
FIG. 3 depicts multitier heterogeneous TPM systems according to embodiments of the present invention.
Figure 4:
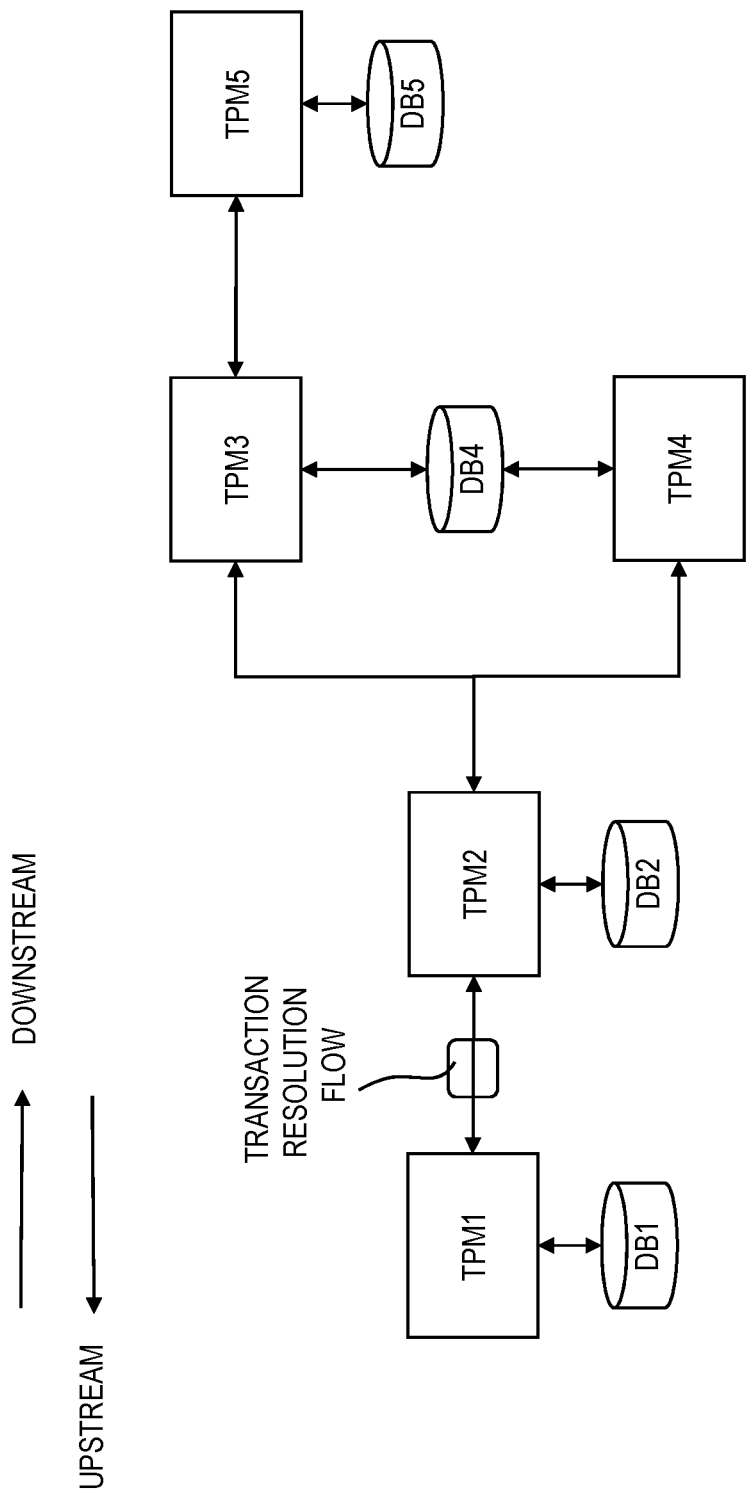
FIG. 4 depicts a TPM coordinator delegating the TPM coordination to one of its TPM participants for transaction resolution according to embodiments of the present invention.

For a transaction that is spanned across multitier heterogeneous TPM systems which required the transaction execution of two types of flows across TPMs, the first flow is application flow which is depicted in FIG. 3 according to embodiments of the present invention (second flow is the transaction resolution flow as depicted in FIG. 4). FIG. 3 depicts multitier heterogeneous TPM systems according to embodiments of the present invention. FIG. 3 illustrates a technique to attach TPM weightage in the application response flow payload. FIG. 3 shows example TPMs 202 as TPM1, TPM2, TPM3, TPM4, and TPM5 and shows example databases 204 as DB1, DB2, DB4, and DB5. In this example, TPM3 and TPM4 are designed to share DB4.

It is noted that the TPM1 (TPM coordinator) has transmitted the application request (i.e., prepare calls/requests) (during the commit-request phase (or voting phase)) in which the TPM1 asks participant TPMs to prepare and take the necessary steps for either committing or aborting the transaction and to vote, either "Yes" commit (if the transaction participant's local portion execution has ended properly), or "No" abort (if a problem has been detected with the local portion).

In accordance with embodiments of the present invention, additional metadata to indicate the TPM weightage and/or a capability flag to indicate each TPM's capability to become TPM coordinator are added to the application response payload flow to identify the (interim) transaction coordinator dynamically and to optimize the transaction resolution flow in a multiple TPM environment as depicted in FIG. 3. Each TPM is configured to calculate and provide its weightage to the TPM coordinator (which initially is TPM1 in this example). The weightage can be detected/determined based on parameters such as recoverable resources participated in the transaction that is executed in the TPM, the kind of operations performed on the resource managers, the location of the TPM in the chain, etc. Each TPM has a TPM identifier to associate its TPM weightage and capability flag. A null or empty capability flag means that the associated TPM is not available to become the TPM coordinator.

During the application response flow, each TPM attaches its weightage information and its capability to become a TPM coordinator (indication flag) as a part of the transaction response payload when the TPM routes its response to its preceding TPM (which is immediately upstream). The preceding TPM is immediately upstream from its subsequent TPM. For example, TPM3 is the preceding TPM for TPM5. TPM2 is the preceding TPM for both TPM3 and TPM4. Similarly, TPM1 is the preceding TPM for TPM 2. The preceding TPM will read the additional metadata from the application response flow payload from all its subsequent TPMs and attaches the information in its response payload to its preceding TPM. This flow continues until the application response reaches back the TPM coordinator (which is TPM1). With the additional metadata from the application response payload, the TPM coordinator has information about its TPM participants involved in the transaction. Using the TPM weightage of its TPM participants available in response payload metadata, the TPM coordinator (TPM1) is configured to compare its own weightage (individually) to each weightage of the participant TPMs (TPM2, TPM3, TPM4, TPM5). If the TPM coordinator weightage is less than the weightage of one of its TPM participants (e.g., TPM2) and that participant TPM is capable of transaction coordination (i.e., TPM2 has its capability flag set), then the TPM coordinator (e.g., TPM1) is configured to signal (depicted in FIGS. 6, 8, and 10) the corresponding TPM participant (e.g., TPM 2) to coordinate the transaction resolution flow as the TPM coordinator in order to achieve better performance during transaction resolution flow. By dynamically changing the TPM coordinator based on weightage, this enables quicker transaction resolution compared to traditional transactional resolution because using the new TPM coordinator minimizes the transaction resolution flows involved during transaction resolution. This improves the function of the computer system by increasing processing speed and increases the speed of processing a transaction which is very beneficial when processing thousands of transactions as discussed herein.

The following scenario is provided for explanation purposes in which the TPM1 is the TPM coordinator of a transaction that is spanned across multitier heterogeneous TPMs (where the TPM1-5 form the multitier heterogeneous TPM systems). The TPM1 is not only responsible for resolving the outcome of XA resolution with DB1, TPM1 is also responsible for the entire LUW that is spread across TPM2, TPM3, TPM4 and TPM5, and the data that each TPM controls as a part of its transaction execution. Because the transaction is spanned across multiple TPMs, the coordinator TPM1 uses a global transaction mechanism across TPMs to achieve a single LUW as understood by one skilled in the art. As noted above, the global transaction execution consists of two types of flows across the TPMs involved in the transaction. The first one is application flow in which actual business logic executes in the TPM (e.g., TPM1-5) and second one is the transaction resolution flow in which the TPM coordinator (TPM1) decides to COMMIT or ROLLBACK the work after confirming the readiness of each participating TPM. A global transaction is uniquely identified by Global Transaction Identifier (GTRId) which is propagated across TPMs. The individual TPMs attach a branch identifier that uniquely identifies the transaction in a TPM. The combination of GTRId and branch identifier uniquely identify a global transaction in a TPM.

In the traditional interconnected TPMs environment, a LUW spans across multiple TPMs, and the transaction resolution flow should be sent to all the TPM participants which are involved in the transaction. The TPM (coordinator) will communicate using proprietary protocols with other TPMs. The transaction resolution involves multiple sync point flows for achieving the global transaction across TPMs. When transaction coordinator TPM1 sends a transaction resolution flow to its subsequent interconnected TPMs (TPM2-5) and resource managers (DB2-5), those TPMs will send the same transaction resolution flow to its subsequent interconnected TPMs and resource managers. This flow continues until the last TPM in a transaction branch involved in the global transaction is reached. For example, TPM1 sends the transaction resolution flow (commit-request phase) to TPM2, which sends to TPM3 and TPM4. TPM3 sends the transaction resolution flow (commit-request phase) to TPM5.

The preceding TPM collects the application response from its subsequent interconnected TPMs and resource managers, decides the response, and sends the response back (upstream) to its preceding TPM. The response flow continues from all transaction branches involved in global transaction until the response reaches the transaction coordinator TPM1. For example, TPM3 collects the response from TPM5. TPM3 sends its response and sends the response of TPM5 back to (upstream) TPM2. TPM4 sends its response back to TPM2. TPM2 has its own response, along with the responses of subsequent TPM3, TPM4, and TPM5. TPM2 sends each of the responses (TPM2-5) back to coordinator TPM1, all of which is part of the application response flow.

In addition to the normal information (completed in each TPM) in the application response, each application response payload (returning back to the coordinator TPM1) includes the TPM weightage and flag to indicate its capability to act as TPM coordinator. Each TPM1-5 is configured to calculate its own TPM weightage using the various dynamic factors like recoverable resources participated in the transaction instance execution in the TPM, the kind of operations performed on the resource managers, whether the TPM is further connected to other TPMs, and so on.

The preceding TPMs (which are TPM1-3 in FIG. 3 because TPM4 and TPM5 have no subsequent TPM) each read the additional metadata (TPM weightage and capability flag) from the application response flow payload from all its subsequent TPMs and attaches the information in its application response payload back up to its preceding TPM. For example, each TPM1-5 calculates its TPM weightage and capability flag (to become the coordinating TPM). TPM5 sends its application response with its TPM weightage and capability flag to TPM3. TPM3 collects the response of the TPM weightage and capability flag from TPM5. TPM3 sends its response which includes its TPM weightage and capability flag along with the TPM weightage and capability flag of TPM5 back (upstream) to TPM2. TPM4 sends its response with its TPM weightage and capability flag back to TPM2. TPM2 now has a response of its own TPM weightage and capability flag along with the TPM weightages and capability flags of the subsequent TPMs (TPM3, TPM4, TPM5). TPM2 sends a response to TPM1 which includes the TPM weightage and capability flag of each subsequent TPM3, TPM4, and TPM5, along with the TPM weightage and capability flag of TPM2. Now, TPM1 has its own TPM weightage and capability flag as well as the TPM weightages and capability flags of TPM2-5 as the additional metadata of the application response. Although only 5 TPMs are shown for explanation purposes, this flow continues until the application response payload for each participating TPM reaches back to (upstream) the TPM coordinator. At every TPM stage, the TPM thinks its preceding TPM is its coordinator for transaction resolution.

Once the application response reaches the TPM coordinator, the TPM coordinator (TPM1) analyzes the metadata of its participants from the application response payload and also calculates its weightage based on recovery operations performed, the number of participants attached to it, etc. As a simple technique for calculating weightage, each TPM that has a subsequent TPM downstream is given X weightage points (regardless if the TPM is directly/immediately connected or not). As such, since TPM3 has one subsequent TPM5, the TPM3 is given X weightage points (e.g., 5 point). However, because TPM2 has 3 subsequent TPMs (TPM3, TPM4, and TPM5), TPM2 has 3×5=15 weightage points in this category. TPM4 and TPM5 have no subsequent TPMs downstream and thus do not receive X weightage points in this category. TPM1 has 4 TPMs subsequent to it (although not directly connected) and is given 4×5=20 weightage points in this category.

Each TPM that is directly/immediately connected to two or more TPMs (like TPM2) is given Y weightage points for each direct/immediate subsequent connection greater than 1. It is assumed that Y weightage points are 50. For example, because TPM2 is directly connected to both TPM3 and TPM4, which is 1 direct connection greater than 1, TPM2 is given 50 weightage points for each additional connection more than 1. If TPM2 would have had 2 direct/immediate subsequent connections greater than 1, then TPM2 would have been given 2×50=100 points in the Y weightage points category.

Each TPM that has the same predefined software as any subsequent TPMs is given Z weightage points, which can be 5 weightage points per subsequent TPM having the same predefined software. For example, if TPM2-5 have the same legacy software, such as C++ etc., then TPM2 is given 15 weightage points (5×3=15). TPM4 and TPM5 have no Z weightage points for this category because there are no subsequent TPMs after TPM4 or TPM5. TPM3 has 5 weightage points in the Z category. TPM1 has no Z weightage points because TPM1 has a different predefined software (e.g., Java based) than any of the TPMs (TPM2-5). Each TPM adds all of the points in its categories X, Y, Z together to obtain its total weightage (score). It should be appreciated that there can be other categories for weightage points that can be added. In one implementation, a category can be negative weightage points because it reduces the weightage for the TPM. For example, a TPM that is acting as the TPM coordinator for over a predefined amount of other transactions (e.g., 5, 10, 20 . . . 50 transactions) receives a −25 points for this category (e.g., category J).

The coordinator TPM1 will individually compare its TPM coordinator weightage to each participant weightage of the TPM participants (TPM2-5) to determine if the TPM coordinator weightage is higher or lower than each participant weightage. If the coordinator TPM1 weightage is less than anyone of its participant weightage and the participant TPM is capable (has the capability flag set) of transaction resolution (in order to become the interim TPM coordinator), the TPM coordinator will decide/select the best TPM coordinator from its TPM participants having a higher weightage than the TPM coordinator weightage. An example of not being capable of being the TPM coordinator is when the TPM is a gateway device like a router. Other examples of not being capable of becoming the TPM coordinator can be due to (predefined) implementation restrictions of the TPM. It is assumed that TPM2 has the highest weightage points (greater than TPM1) and TPM2 is capable (i.e., has its flag set) of becoming the interim TPM coordinator. FIG. 4 depicts an example of the TPM coordinator delegating the TPM coordination to one of its TPM participants for transaction resolution according to embodiments of the present invention.

As depicted in FIG. 4, the TPM coordinator (TPM1) sends XA prepare request to TPM2 by attaching TPM1 prepare response flag for committing the work, and TPM coordinator takeover flag. The TPM coordinator (TPM1 which is a Java based TPM) also applies transaction resolution optimization by preparing its local resource managers (DB1) and sends its readiness for COMMIT as part of the transaction coordination takeover request flow to the TPM2. The TPM2 takes over the transaction coordination from TPM1. The TPM2 prepares its participants. Because TPM2 and its subsequent TPMs like TPM3, TPM4, and TPM5 are similar kinds (e.g., same predefined software) of TPMs (non-Java TPMs), the TPM2 can apply its proprietary protocol based optimizations for transaction resolution (because TPM2-5 each have the matching predefined software). After taking over transaction coordination from TPM1, the TPM2 is configured to resolve the transaction by passing the transaction resolution calls (XA PREPARE, XA COMMIT, XA ROLLBACK, etc.). After transaction resolution completes, the interim coordinator TPM2 will send resolution (XA COMMIT/XA ROLLBACK) to the actual TPM coordinator TPM1. TPM1 will communicate the same to the transaction initiating client (such as, e.g., an application or computer requesting the transaction) if required.

Figure 5:
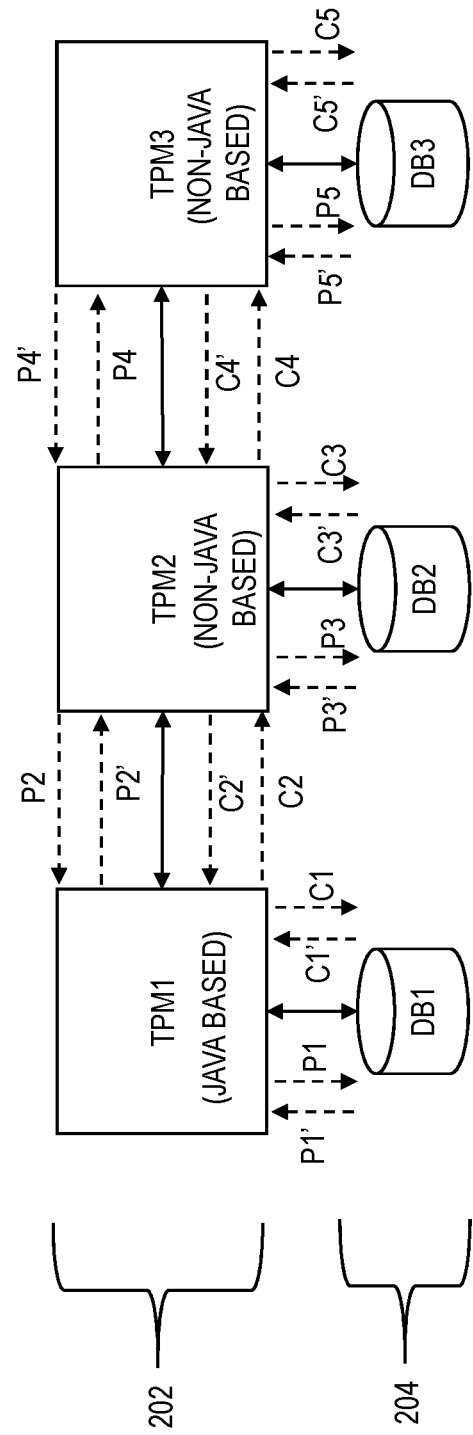
FIG. 5 depicts an example in which TPM coordinator is coordinating the transaction according to embodiments of the present invention.
Figure 6:
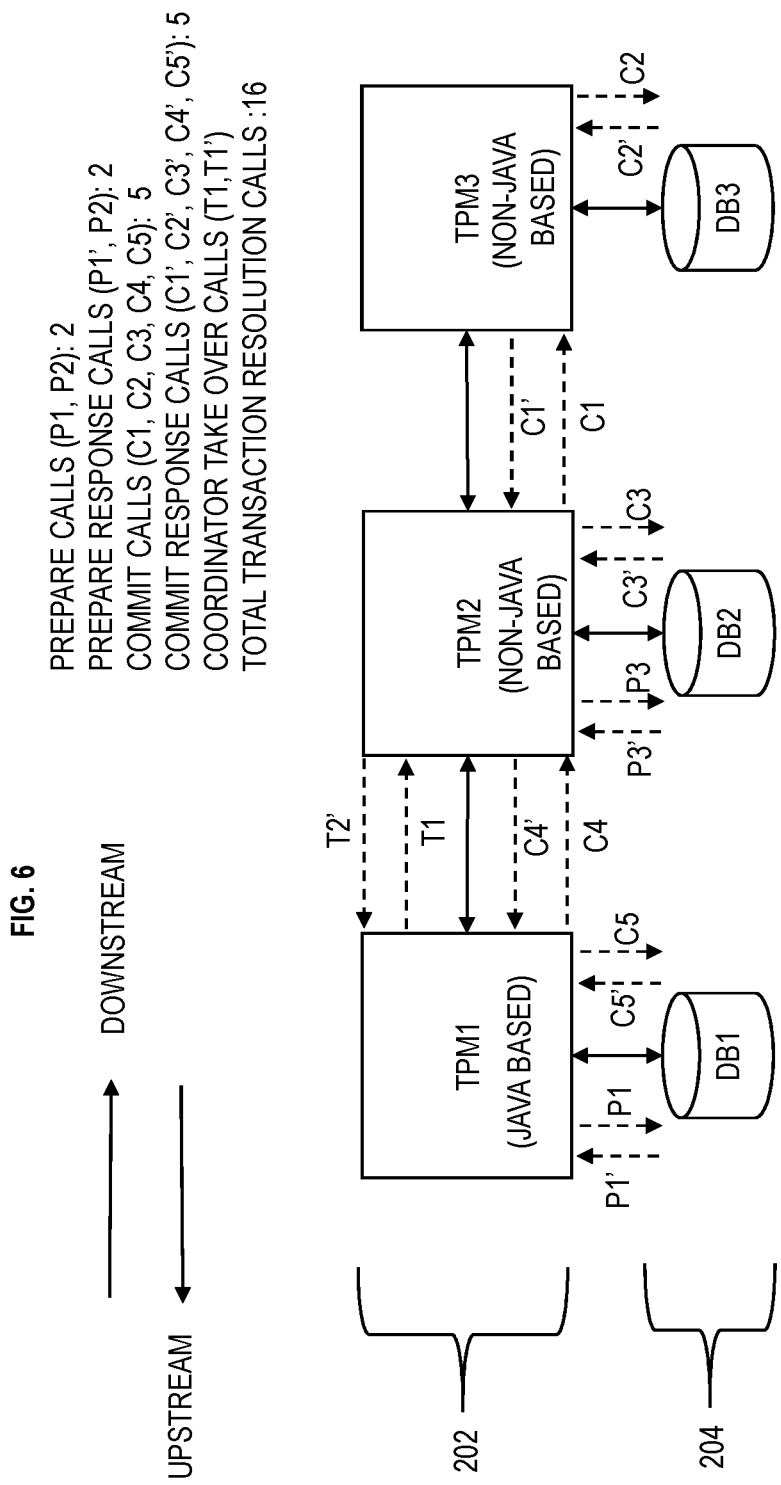
FIG. 6 depicts an example in which a participant TPM has taken over transaction coordination for the transaction according to embodiments of the present invention.

An example scenario is depicted below in which all TPMs involved in the transaction performed recovery operations on its local resource managers. FIG. 5 depicts an example in which TPM1 is coordinating the transaction and TPMs performed recovery operations according to embodiments of the present invention. FIG. 6 depicts an example in which TPM2 has taken over transaction coordination for the transaction and all TPMs performed recovery operations.

The example scenario as depicted in FIG. 5 shows the scenario when transaction initiating TPM (TPM1) performs update operations on the resource manager (DB1) connected to it locally. As the transaction spanned across multitier hybrid transaction processing middleware systems, the TPM1 will (always) send the XA PREPARE flow to TPM2 (in FIG. 5). TPM2 prepares its local participants (including DB2) and sends XA PREPARE to TPM3. TPM3 prepares its local participants (including DB3) and sends the prepare response to TPM2. Then, TPM2 sends the XA prepare response to TPM1. TPM1 then sends XA COMMIT/ROLLBACK call flow to TPM2. TPM2 is configured to COMMIT/ROLLBACK its local participants (DB1) and send XA COMMIT/ROLLBACK to TPM3. TPM3 is configured to COMMIT/ROLLBACK its local participants (DB3) and send the COMMIT/ROLLBACK response to TPM2. Then, TPM2 sends the XA COMMIT/ROLLBACK response to TPM1. FIG. 5 depicts the number of transaction resolution calls (20) involved to resolve the transaction. Because TPM1 is different (i.e., a different predefined software) from TPM2 and TPM3, TPM1 cannot optimize the transaction resolution flow.

With the technique as depicted in FIG. 6 according to embodiments of the present invention, TPM1 sends the TPM takeover request (T1) to TPM2 after doing a prepare with local resources (DB1). Because the TPM1 has done the prepare operations, TPM2 will optimize the transaction resolution flow by performing prepare request to DB2 and based on the prepare response, TPM2 sends directly COMMIT request to TPM3. The TPM3 sends the COMMIT request to DB3. Based on the COMMIT response from TPM3, the TPM2 is configured to COMMIT the operations performed on DB2, and then TPM2 completes the transaction resolution flow. TPM2 sends the transaction resolution completion response (T1') to TPM1. As depicted in FIG. 6, the number of transaction resolution calls reduced from 20 to 16 when the TPM coordinator is chosen dynamically for transaction resolution. With the technique discussed in embodiments of the present invention, changing the TPM coordinator dynamically for transaction resolution saved 4 transaction resolution calls as depicted in FIG. 6 (as compared to FIG. 5).

Figure 7:
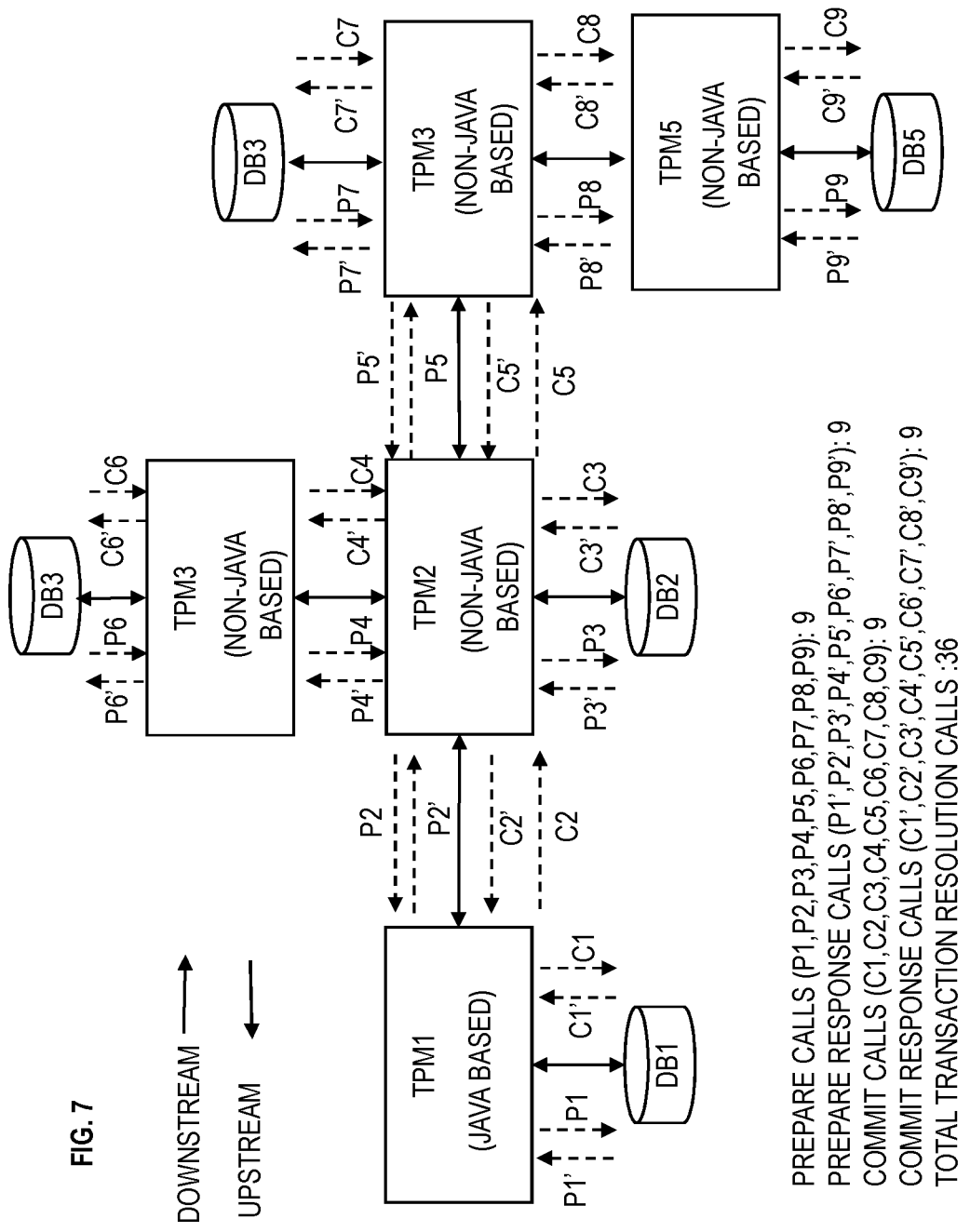
FIG. 7 depicts the TPM coordinator coordinating the transaction according to embodiments of the present invention.
Figure 8:
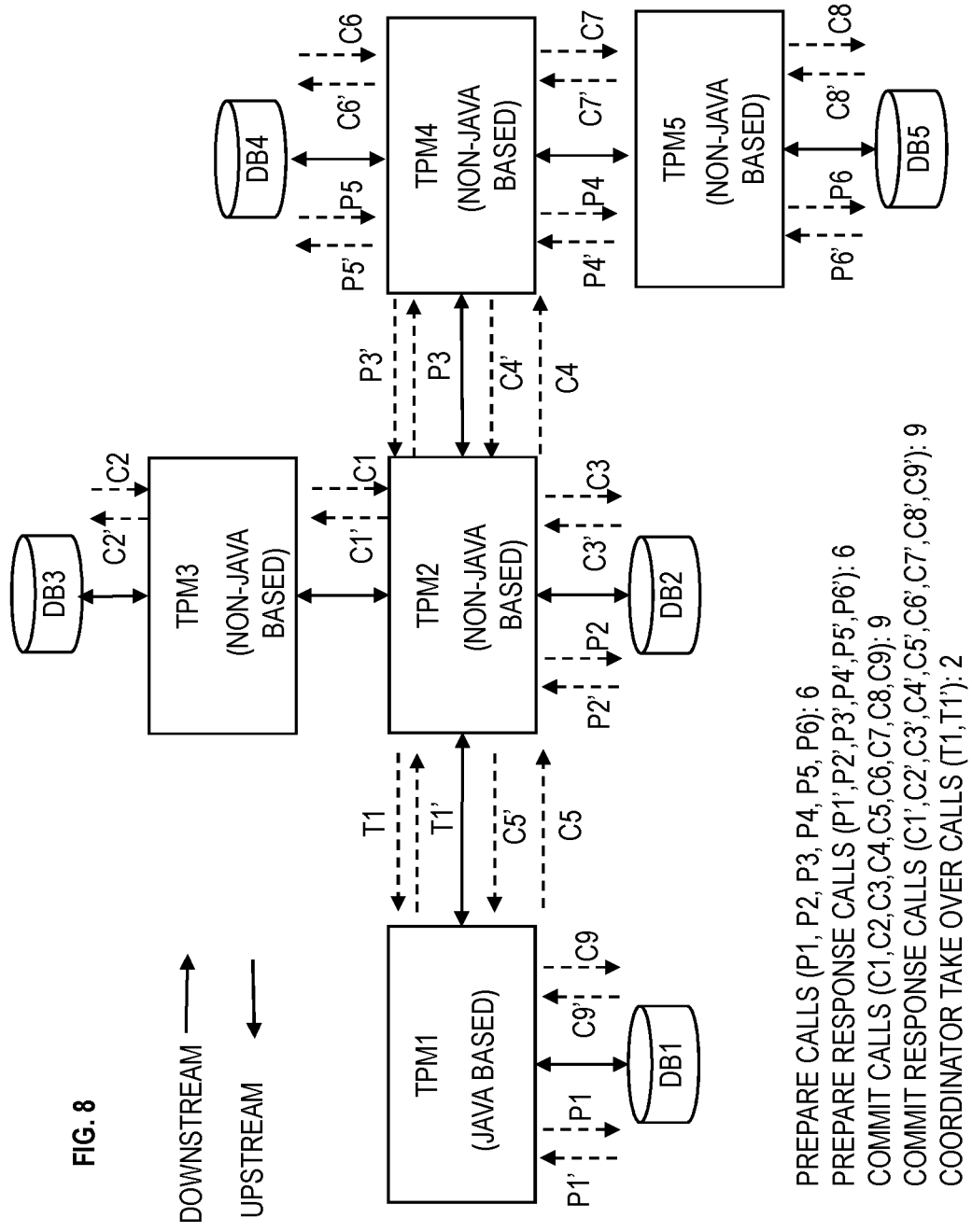
FIG. 8 depicts changing the TPM coordinator dynamically for transaction resolution according to embodiments of the present invention.

An example scenario is depicted below in which multiple TPMs are involved in the transaction and all performed recovery operations on its local resource managers. FIG. 7 depicts a scenario where all the TPMs involved in the transaction performed the recovery operations on the resource managers respectively connected to it. In FIG. 7, TPM1 is coordinating the transaction and TPMs performed recovery operations. However, with the techniques of embodiments of the present invention, FIG. 8 depicts changing the TPM coordinator dynamically for transaction resolution which saved 4 transaction resolution calls (as compared to FIG. 7 without dynamically changing the TPM coordinator). In FIG. 8, TPM2 has taken over transaction coordination for the transaction and all TPMs performed recovery operations.

Although the above scenarios saved some transaction resolution calls, based on the resolution operation performed on resource managers at every TPM, further transaction resolution optimization can be applied that saves further transaction resolution calls. The techniques of embodiments of the invention can be applied to any multitier hybrid transaction processing middleware systems environment to gain the transaction resolution flow optimization. It is noted that the transaction resolution calls saved (i.e., reduced or removed) in the examples discussed herein are (only shown) for a single transaction (i.e., a transaction instance). In multitier hybrid transaction processing middleware systems, there can be thousands of transactions, and embodiments of the invention correspondingly save thousands of transaction resolution calls by changing the TPM coordinator dynamically. As noted herein, this improves the functioning of a computer by improving the speed of processing transactions and reducing the number of calls.

Figure 9:
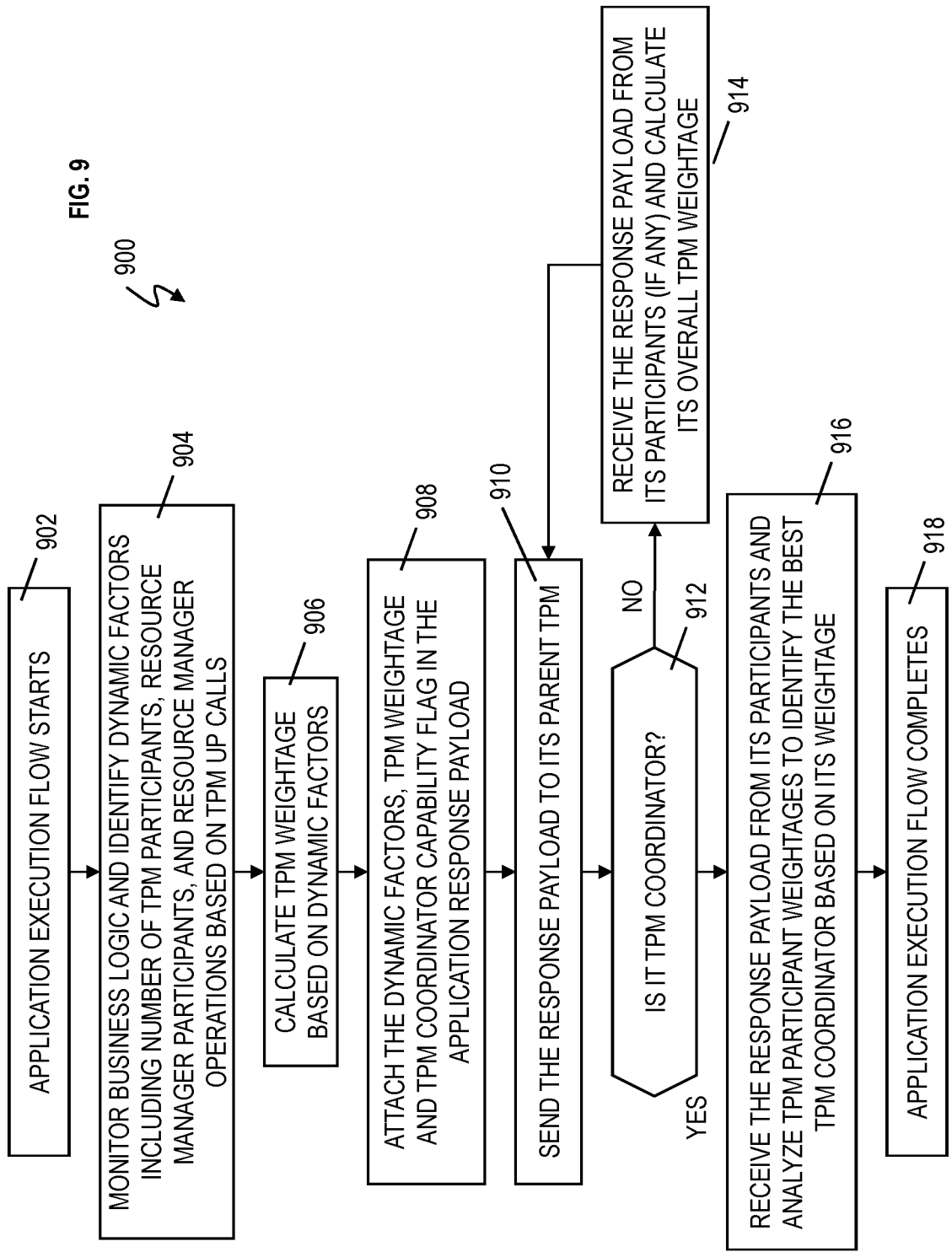
FIG. 9 depicts a flow chart illustrating the application execution flow in a TPM when choosing the dynamic transaction coordinator according to embodiments of the present invention.

FIG. 9 depicts a flow chart 900 illustrating the application execution flow in the TPM for choosing the dynamic transaction coordinator according to embodiments of the present invention. Each TPM 202 is configured to execute operations in FIG. 9 and then pass the application response payload back up (i.e., upstream) to its preceding TPM 202 during the commit-request phase as discussed herein. Reference can be made to any of the figures discussed herein.

At block 902, the TPM (TPM1, TPM2, TPM3, TPM4, TPM5) is configured to start the application execution flow. At block 904, TPM is configured to monitor business logic and identify dynamic factors (of weightage) including numbers of TPM participants, resource manager participants, and resource manager operations based on TPM up calls. A TPM can register callback functions whenever a recoverable operation happens in any of the participants. At block 906, the TPM is configured to calculate the TPM weightage based on dynamic factors and/or based on registered callback functions.

At block 908, the TPM is configured to attach the dynamic factors, TPM weightage, and TPM coordinator capability flag in the application response payload. The TPM is configured to send the response payload to its parent/preceding TPM at block 910.

At block 912, the TPM (i.e., parent/preceding TPM) is configured to check if it is the TPM coordinator. If the parent/preceding TPM is not the TPM coordinator, the preceding TPM is configured to receive the response payload from its participants (if any) and calculate its overall TPM weightage at block 914; the TPM is configured to send the application response payload to its parent/preceding TPM at block 910. If the TPM (i.e., parent/preceding TPM) is the TPM coordinator (such as, e.g., TPM1), the TPM is configured to receive the application response payload from its TPM participants and analyze TPM participant weightages (along with the TPM weightage of the TPM coordinator itself) to identify the best TPM coordinator based on its weightage at block 916. For example, the TPM with the highest weightage is selected by the TPM coordinator (e.g., TPM1) to be the interim TPM coordinator (e.g., TPM2). The application execution flow completes at block 918.

Figure 10:
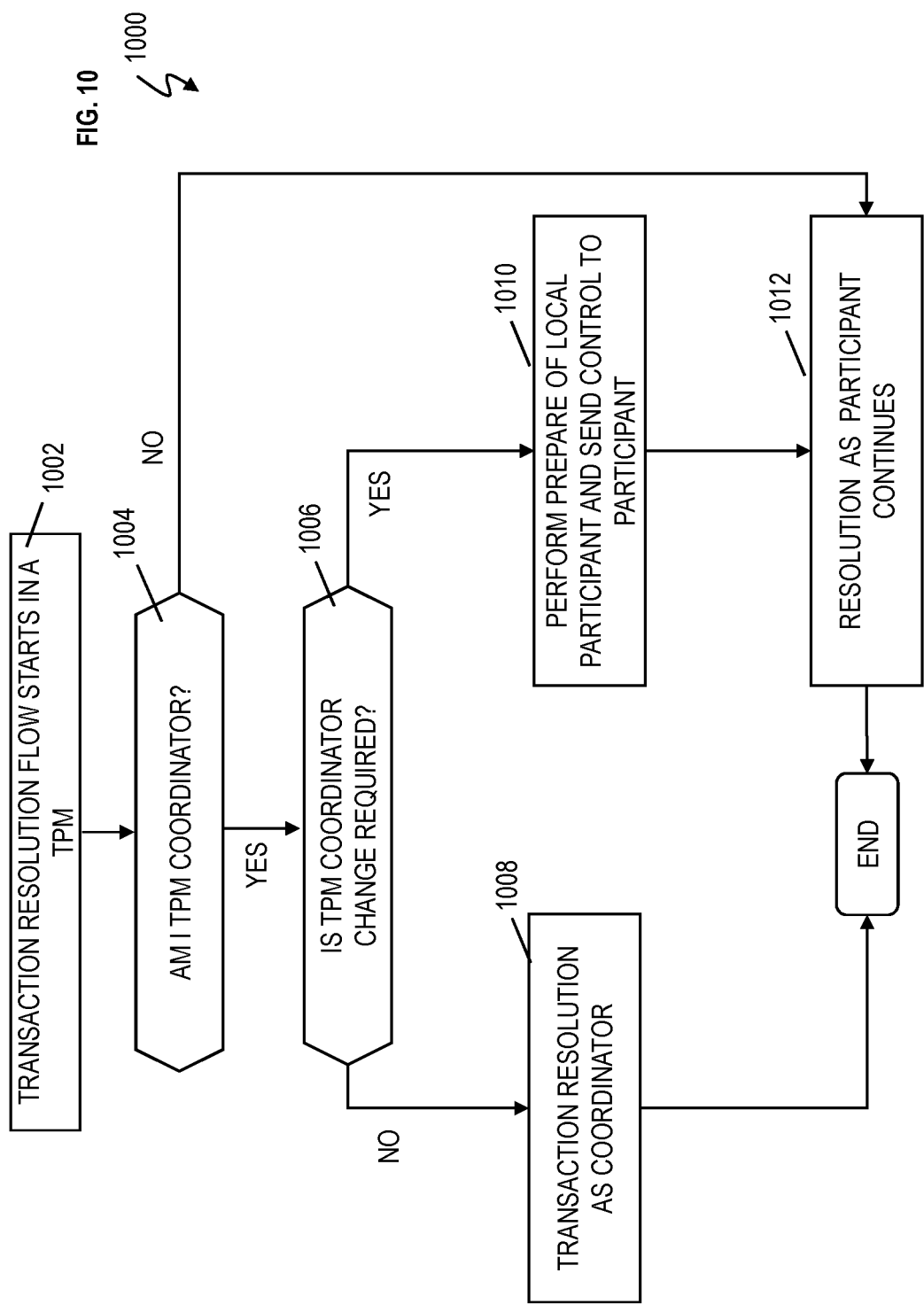
FIG. 10 depicts a flow chart illustrating the transaction resolution flow in a TPM for choosing the dynamic transaction coordinator according to embodiments of the present invention.

FIG. 10 depicts a flow chart 1000 describing the transaction resolution flow in the TPM for choosing dynamic transaction coordinator according to embodiments of the present invention. Each TPM 202 is configured to execute operations in FIG. 10 during the commit-request phase. Reference can be made to any of the figures discussed herein.

At block 1002, the transaction resolution flow starts in a TPM (e.g., TPM1, TPM2, TPM3, TPM4, TPM5). At block 1004, the TPM is configured to check if it is the TPM coordinator. If the TPM is not the TPM coordinator, the TPM continues its resolution as a participant at block 1012. In the examples discussed herein, TPM1 has been the TPM coordinator before any change of TPM coordinator has occurred.

If the TPM is the TPM coordinator, the TPM is configured to check if a TPM coordinator change is required at block 1006. It is assumed that the TPM coordinator has received the TPM weightages of its TPM participants, calculated its own TPM weightage, and performed analysis (based on weightage) to determine if a TPM participant should be the interim TPM coordinator instead of the current TPM coordinator.

If no TPM coordinator change is required, the TPM coordinator is configured to continue the transaction resolution as TPM coordinator at block 1008, and the flow ends. For example, TPM1 remains the TPM coordinator for the transaction. If yes, a TPM coordinator change is required, the TPM coordinator is configured to perform a prepare of the local participant and send control to inform the interim TPM coordinator to take over coordinator privilege with its local prepare response (e.g., via coordinator take over calls (T1, T1')) to that local participant at block 1010. At block 1012, resolution as a participant continues.

FIG. 11 is a flow chart 1100 of a computer-implemented method for dynamically determining a transaction coordinator according to embodiments of the present invention.

At block 1102, a transaction processing middleware (TPM) coordinator (e.g., TPM1) is configured to receive TPM weightages of TPM participants (e.g., TPM2, TPM3, TPM4, TPM5, etc.), where the TPM coordinator has a TPM coordinator weightage, where the TPM coordinator and TPM participants are executing a transaction instance. The transaction instance is global.

At block 1104, the TPM coordinator (e.g., TPM1) is configured to individually comparing the TPM coordinator weightage (which is its own weightage) to each of the individual TPM weightages of the TPM participants (e.g., TPM2, TPM3, TPM4, TPM5, etc.)

At block 1106, the TPM coordinator (e.g., TPM1) is configured to, in response to not one of the TPM weightages of the TPM participants being greater than the TPM coordinator weightage, keep the TPM coordinator the same (i.e., not change to the TPM coordinator).

At block 1108, the TPM coordinator (e.g., TPM1) is configured to, in response to a given TPM weightage of the TPM weightages of the TPM participants being greater than the TPM coordinator weightage, change (give) a TPM coordinator function to a given TPM participant (e.g., TPM2) having the given TPM weightage such that the given TPM participant (e.g., TPM2) is an interim TPM coordinator for the transaction instance. TPM coordinator take over calls (T1, T1') can be utilized to change the TPM coordinator from, for example, TPM1 to TPM2.

The TPM1 and/or TPM2 can be configured to change the TPM coordinator function back to the TPM coordinator (TPM1) in response to completion of the transaction instance. Analogous (but in the opposite direction) TPM coordinator take over calls (T1, T1') can be utilized to change the TPM coordinator back from, for example, TPM2 to TPM1.

The TPM weightages of the TPM participants are calculated for each of the TPM participants (by the respective TPMs (e.g., TPM2-5)), and the TPM coordinator weightage is calculated for the TPM coordinator (by the TPM coordinator (e.g., TPM1)). Calculation of the TPM weightages and the TPM coordinator weightage are based on factors. The factors are selected from the group consisting of the following: a first score for a number of TPM participants downstream and/or a second score for each direct connection to another TPM participant that is more one. Upstream is going toward the TPM coordinator that originally initiated the transaction instance, such that TPM1 is the TPM furthest upstream and each TPM participant is downstream from TPM1. TPM2 is immediately/directly downstream from (or subsequent to) TPM1. Also, TPM3 and TPM4 are immediately downstream (or subsequent) from TPM2 (in FIGS. 3, 4, 7, and 8).

Additionally, the factors further can include a third score for having a first predefined software the same as another TPM participant that is downstream. For example, TPM2 can have the same predefined software as each or some of the TPMs downstream and the TPM2 has an increase in weightage by the third score amount for each downstream TPM having the same predefined software (such as, e.g., C++). The TPM coordinator (e.g., TPM1) operates on a second predefined software (e.g., Java based) that is different from the first predefined software (e.g., C++).

Individually comparing the TPM coordinator weightage to each of the TPM weightages of the TPM participants further comprises the TPM coordinator (e.g., TPM1) checking whether any of the TPM participants have a capability flag set which indicates availability to become the interim TPM coordinator and perform the TPM coordinator function. However, in response to no capability flag being found by the TPM coordinator (e.g., TPM1) for ones of the TPM participants, the TPM coordinator is configured to eliminate the ones of the TPM participants from potentially (or the possibility of) becoming the interim TPM coordinator.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving, by a coordinator on a computer system, weightages of participants, the coordinator having a coordinator weightage;
   comparing, by the coordinator, the coordinator weightage to each of the weightages of the participants;
   allowing the coordinator to be unchanged in response to none of the weightages of the participants being greater than the coordinator weightage; and
   changing a coordinator function to one of the participants in response to the one of the participants having a weightage greater than the coordinator weightage.

2. The computer-implemented method of claim 1, wherein the one of the participants is an interim coordinator for a transaction instance;
   further comprising changing the coordinator function back to the coordinator in response to completion of the transaction instance.

3. The computer-implemented method of claim 1, wherein the weightages of the participants are calculated for each of the participants and the coordinator weightage is calculated for the coordinator.

4. The computer-implemented method of claim 3, wherein calculation of the weightages and the coordinator weightage is based on factors; and
   wherein the factors are selected from the group consisting of the following:
      a first score for a number of participants downstream; and
      a second score for each direct connection to another participant that is more one.

5. The computer-implemented method of claim 4, wherein the factors further comprise a third score for having a first software a same as some other participant that is downstream; and
   wherein the coordinator operates on a second software that is different from the first software.

6. The computer-implemented method of claim 1, wherein comparing, by the coordinator, the coordinator weightage to each of the weightages of the participants further comprises checking whether any of the participants has a capability flag set which indicates availability to become an interim coordinator and perform the coordinator function.

7. The computer-implemented method of claim 6, wherein in response to no capability flag being set for the any of the participants, the coordinator is configured to eliminate the any of the participants from potentially becoming the interim coordinator.

8. A computer program product comprising a computer readable storage medium having program instructions embodied therewith, wherein the computer readable storage medium is not a transitory signal per se, the program instructions readable by a computer system to cause the computer system to perform a method comprising:
   receiving, by a coordinator, weightages of participants, the coordinator having a coordinator weightage;
   comparing, by the coordinator, the coordinator weightage to each of the weightages of the participants;
   allowing the coordinator to be unchanged in response to none of the weightages of the participants being greater than the coordinator weightage; and
   changing a coordinator function to one of the participants in response to the one of the participants having a weightage greater than the coordinator weightage.

9. The computer program product of claim 8, wherein the one of the participants is an interim coordinator for a transaction instance;

further comprising changing the coordinator function back to the coordinator in response to completion of the transaction instance.

10. The computer program product of claim 8, wherein the weightages of the participants are calculated for each of the participants and the coordinator weightage is calculated for the coordinator.

11. The computer program product of claim 10, wherein calculation of the weightages and the coordinator weightage is based on factors; and
wherein the factors are selected from the group consisting of the following:
a first score for a number of participants downstream; and
a second score for each direct connection to another participant that is more one.

12. The computer program product of claim 11, wherein the factors further comprise a third score for having a first software a same as some other participant that is downstream; and
wherein the coordinator operates on a second software that is different from the first software.

13. The computer program product of claim 8, wherein comparing, by the coordinator, the coordinator weightage to each of the weightages of the participants further comprises checking whether any of the participants has a capability flag set which indicates availability to become an interim coordinator and perform the coordinator function.

14. The computer program product of claim 13, wherein in response to no capability flag being set for the any of the participants, the coordinator is configured to eliminate the any of the participants from potentially becoming the interim coordinator.

15. A computer system comprising:
a processing circuit; and
a storage medium readable by the processing circuit and storing instructions that, when executed by the processing circuit, cause the processing circuit to perform a method comprising:
receiving, by a coordinator on a computer system, weightages of participants, the coordinator having a coordinator weightage;
comparing, by the coordinator, the coordinator weightage to each of the weightages of the participants;
allowing the coordinator to be unchanged in response to none of the weightages of the participants being greater than the coordinator weightage; and
changing a coordinator function to one of the participants in response to the one of the participants having a weightage greater than the coordinator weightage.

16. The computer system of claim 15, wherein the one of the participants is an interim coordinator for a transaction instance;
further comprising changing the coordinator function back to the coordinator in response to completion of the transaction instance.

17. The computer system of claim 15, wherein the weightages of the participants are calculated for each of the participants and the coordinator weightage is calculated for the coordinator.

18. The computer system of claim 17, wherein calculation of the weightages and the coordinator weightage is based on factors; and
wherein the factors are selected from the group consisting of the following:
a first score for a number of participants downstream; and
a second score for each direct connection to another participant that is more one.

19. The computer system of claim 18, wherein the factors further comprise a third score for having a first software a same as some other participant that is downstream; and
wherein the coordinator operates on a second software that is different from the first software.

20. The computer system of claim 15, wherein comparing, by the coordinator, the coordinator weightage to each of the weightages of the participants further comprises checking whether any of the participants has a capability flag set which indicates availability to become an interim coordinator and perform the coordinator function.

* * * * *